United States Patent Office 3,509,055
Patented Apr. 28, 1970

3,509,055
OIL-SOLUBLE DISPERSANTS, METHODS OF MAKING THEM AND LUBRICATING COMPOSITIONS CONTAINING THEM
La Verne N. Bauer, Cheltenham, Pa., assignor to Rohm and Haas Company, Philadelphia, Pa., a corporation of Delaware
No Drawing. Continuation of application Ser. No. 539,221, Mar. 31, 1966, which is a continuation of application Ser. No. 221,306, Sept. 4, 1962. This application Jan. 8, 1969, Ser. No. 789,933
Int. Cl. C10m 1/26; C08f 37/06
U.S. Cl. 252—56   21 Claims

ABSTRACT OF THE DISCLOSURE

Oil-soluble dispersant polymers are prepared by polymerizing at least one monoethylenically unsaturated ester having an oil-solubilizing group until about 50% to 90% thereof has polymerized, then adding itaconic or maleic anhydride in an amount from 1 to 10% of the weight of said ester, the anhydride being dissolved in a lower acrylate, and then copolymerizing the mixture.

---

This application is a continuation of my copending application Ser. No. 539,221, filed Mar. 31, 1966, which is in turn a continuation of Ser. No. 221,306, filed Sept. 4, 1962 both now abandoned.

This invention deals with oil-soluble dispersants which are oil-soluble copolymers having grafted thereon units from maleic and/or itaconic anhydride. It also concerns methods for the preparation of these graft copolymers dissolved therein.

It is known that maleic anhydride by itself does not provide useful polymers but that it copolymerizes with monovinylidene compounds to form interpolymers in which alternating units predominate even in an excess of the monovinylidene comonomer. At one time such copolymers were termed heteropolymers. These tend to be hard, brittle solids which can be solubilized in aqueous systems. They can be converted to esters, to amides, to imides, or to salts by procedures known in the art and resulting products may be soluble in oils if groups are large enough. None of these products, however, has proved entirely satisfactory in oils. In particular, they have not shown effective dispersion action.

Applicant has observed that ordinary oil-soluble copolymers can be prepared from mixtures of comonomers which include maleic anhydride. If sufficient of it is used, it is possible to obtain copolymers which exhibit some dispersing action. Such copolymers tend, however, to be unstable in oils, for it has been observed that under some conditions rubbery gums separate from motor oils containing them. Even some copolymers of this type modified by reaction with long-chained alcohols can form gums under some conditions of use. Itaconic anhydride behaves similarly.

It has now been discovered that units from maleic anhydride and/or itaconic anhydride can be introduced onto an oil-soluble base polymer and that the resulting graft copolymers retain the desirable properties of the base copolymer and in addition acquire new and valuable properties, especially with respect to dispersing action. They exhibit greater dispersing activity with lower proportions of maleic anhydride than need be used in conventional copolymers for this end and are then much less prone to react, separate, or cross-link. At the same time, these graft copolymers can supply other desirable actions or properties, such as improvement in viscosity index and pour point depression by selection of comonomers for forming the base polymer. Furthermore, the graft copolymers may be further modified as by reaction with amines, alcohols, mercaptans, bases, or phosphorus esters.

The method for preparing the graft copolymers of this invention comprises polymerizing with a free radical polymerization initiator at least one polymerizable monoethylenically unsaturated ester as monomer supplying an oil-solubilizing group until about 50% to 90% thereof has been polymerized to a base polymer and adding maleic anhydride or itaconic anhydride to the polymerizing mixture and copolymerizing it therewith under the influence of a free radical polymerization initiator, the anhydride or mixture of anhydrides being about 1% to about 10%, preferably between 1% and 5%, by weight of the starting monomer or monomers.

The starting monomer or monomers comprise esters of acrylic, methacrylic, itaconic, or fumaric acid or vinyl carboxylates or mixtures of these monoethylenically unsaturated esters, these esters having hydrocarbon groups of sufficient average size to provide the needed solubility of the final graft copolymers in the liquid in which they find use. Usual groups for supplying the desired oil-solubility are commonly alkyl groups derived from the alcohol used for esterification of the unsaturated acids or present in the acid residue of the carboxylic acid used to form vinyl esters, these oil-solubilizing alkyl groups having at least eight carbon atoms. Thus, octyl, nonyl, decyl, undecyl, dodecyl, tridecyl, tetradecyl, hexadecyl, octadecyl, eisosyl, or tetracosyl acrylates, methacrylates, itaconates, or fumarates can be taken. The alkyl groups may have straight or branched chains. Esters with smaller alkyl groups may also be used, such as methyl, ethyl, propyl, butyl, amyl, hexyl or heptyl, provided the average size of the hydrocarbon groups is sufficient to provide the the needed solubility. Similarly, there may be used in forming base polymer esters of the above acids having an alcohol residue containing a carbocycle, as in benzyl, cyclopentyl, cyclohexyl, dicyclopentyl, phenyl, or alkylphenyl. With regard to vinyl carboxylates the acid residue may be that from the acetate through the stearate or larger fatty carboxylate. The average size of these hydrocarbon groups is sufficient to provide the needed solubility.

In the formation of the base polymer, there may also be used in one or more other polymerizable monoethylenic comonomers. These include esters of the above-mentioned unsaturated carboxylic acids formed with alcohols having the heteroatoms oxygen, sulfur, nitrogen, or phosphorus. Typical alcohol residues of this sort are methoxyethyl, ethoxyethyl, butoxyethyl, octoxyethyl, ethoxypropyl, butoxypropyl, ethoxyethoxyethyl, butoxyethoxyethoxyethyl, phenoxyethyl, benzoxyethyl, cyclohexoxyethyl, and other similar ether containing radicals, ethylthioethyl, ethylsulfonylethyl, dodecylthioethyl, and thioethers comparable to the above ethers, or acetoxyethyl, acetoxypropyl, butyroxyethyl, butyroxypropyl, and dodecanoyloxyethyl, or dimethylaminoethyl, tert-butylaminoethyl, and tert-nonylaminoethyl, or diethyl phosphonoethyl, and dibutyl phosphitoethyl.

There may likewise be used esters of maleic acid, such as dimethyl, dioctyl, or didodecyl maleate. Maleates are best used in conjunction with other more readily polymerizable ester or esters. To a lesser degree this is also true of fumaric esters.

Other types of polymerizable monovinylidene monomers may be copolymerized, such as styrene, p-chlorostyrene, p-methylstyrene, α-methylstyrene, acrylonitrile, methacrylonitrile, methacrylamide, N-phenylacrylamide, N,N-dimethylacrylamide, N-butylmethacrylamide, N,N-diethylmethacrylamide, vinyl chloride, vinylidene chloride, vinyl ketones and vinyl ethers typified by vinyl butyl ether, vinyl butyl thioether, dodecyl vinyl ether, cyclohexyl vinyl ether, benzyl vinyl ether, or phenyl vinyl ether.

The starting monomer or mixture of monomers is polymerized, best in the presence of a solvent, under the influence of a free radical polymerization initiator. It is desirable that the monomer be under an inert atmosphere and for this purpose nitrogen, argon or the like may be used. Such initiator may be an azo catalyst, a peroxide, or a hydroperoxide.

While polymerization may be effected in bulk, monomer serving as solvent at least at the start, it is usually more convenient to effect polymerization in a solvent in which the base polymer is soluble. This provides a less viscous mixture which is more efficiently agitated. Suitable solvents include aromatic hydrocarbons, such as benzene, toluene, xylene, and aromatic distillates, chlorinated hydrocarbons, such as ethylene dichloride, esters such as butyl acetate or ethyl propionate, and petroleum oils which are relatively free of inhibiting or interfering substances. The solvent may be supplemented as polymerization proceeds and several types of solvent may be used. Solvent may be retained with the final polymer or volatile solvent may be distilled off and, if desired, replaced with a relatively non-volatile solvent.

Thus, a volatile solvent may be displaced and polymer taken up with a good quality oil, such as a 100 or 150 neutral oil, to give a solution of final polymer in oil. Similarly, a synthetic lubricant, such as dibutyl or dioctyl sebacate, dioctyl azeleate, tributyl or tricresyl phosphate, a silicate ester, or a silicone fluid may be used to dissolve or take up polymer.

The base polymer is formed by heating starting monomer or mixture of monomers with polymerization initiator between 60° and 150° C., the temperature used depending in part upon choice of initiator. Polymerization may be started at one temperature and continued at another. Addition of initiator may be complete at the start or initiator may be supplied in increments as polymerization progresses.

There are possible variations in the way of effecting formation of base polymer. If desired, the entire charge of starting monomer or monomers may be taken at the start. Alternatively, part of starting monomer or monomers may be charged at the start and additional monomer or other monomer for forming base polymer supplied as polymerization proceeds. Increments of initiator may be supplied as polymerization proceeds, if so desired.

As initiator, there may be used an azo catalyst, such as azodiisobutyronitrile, azodiisobutyramide, azodimethylvaleronitrile, azobis($\alpha$-ethylbutyronitrile), azobis($\alpha,\gamma$-dimethylcapronitrile) or dimethyl azodiisobutyrate. In one variation of procedure, an azo catalyst is used at one stage of polymerization and another type of free radical polymerization initator is used at another.

Peroxidic initiators which are useful include acetyl peroxide, benzoyl peroxide, caproyl peroxide, lauroyl peroxide, di-tert-butyl perphthalate, tert-butyl perbenzoate, 2,2-bis(tert-butylperoxy)butane, or methyl ethyl ketone peroxide. There may also be used organic hydroperoxides, typical of which are tert-butyl hydroperoxide, cumene hydroperoxide, diisopropylbenzene hydroperoxide, p-menthane hydroperoxide, pinane hydroperoxide, 2,5-dimethylhexane-2,5-dihydroperoxide, and other tert-alkyl and hydrocarbon substituted benzene hydroperoxides. When a hydroperoxide is used at the start, its effect may be utilized or carried through the several stages of polymerization or one or more hydroperoxides may be supplied in increments in the several stages.

In conjunction with a hydroperoxide, it is desirable, although not essential, to supply an activator. Its effect, at least in part, is to provide free radicals at lower temperatures than would otherwise be effective for forming free radicals. Effective as activators are quaternary compounds which are soluble in the polymerizing mixture. Typical quaternary ammonium compounds thus useful are benzyltrimethylammonium chloride,
dibenzyldimethylammonium bromide,
butyldimethylbenzylammonium chloride,
octyltrimethylammonium chloride,
dodecyldimethylbenzylammonium chloride,
nonylbenzyltrimethylammonium chloride,
dodecylbenzyldimethylbenzylammonium chloride,
didodecenyldimethylammonium chloride,
benzyldimethyldodecenylammonium chloride,
octylphenoxyethyldimethylbenzylammonium chloride,
diisobutylphenoxyethoxyethyldimethylbenzylammonium chloride,
cetylpyridinium bromide,
N-octyl-N-methylmorpholinium chloride or bis-quaternary ammonium salts, such as those having quaternary nitrogens linked with an alkylene group or an ether group or an amide-containing group.

Activator is proportioned to the amount of hydroperoxide used. Usually, quaternary ammonium compound amounts to 5% to 40% of the weight of hydroperoxide.

An effective amount of initiator or initiators is between 0.01% and about 5% of the weight of monomers. In the first stage, it is preferred to use from 0.05% to 2.5% of initiator based on the weight of monomers used to form base polymer, unless it is desired to produce polymer of low molecular weight in which case even more and up to 5% may be desired. In the second stage, it is desirable to supply from about 0.1% to about 1% of initiator although, as has been noted, the charge of initiator may be supplied in the first stage as well as at the several stages.

When polymerization in the first stage has been carried to 50% to 90% to form base polymer, addition of maleic or itaconic anhydride is made. It may be supplied in one lot or it may be added gradually. It is best to add this component in solution. It may be dissolved in a suitable solvent, such as acetone or methyl ethyl ketone, or it may be dissolved in one or more polymerizable ethylenically unsaturated monomers. Acrylic esters having lower alkyl groups are particularly desirable for this purpose. For instance, the desired amount of anhydride, from about 1% up to 10%, preferably between 1% and 5%, and best 1.3% to 3%, may be dissolved in the methyl, ethyl, propyl, or butyl acrylate or methacrylate and the solution added to the base polymer. Additional initiator may also be supplied at this stage.

Extent of polymerization in the first stage may be determined by volatilizing solvent and residual monomer by heating, desirably under reduced pressure. Polymer may also be determined by precipitation with a non-solvent for the polymer. The precipitated polymer may be washed with a volatile material such as pentane and dried by heating. After pilot experiments in which extent of polymerization has been determined under a given set of conditions, and a proper time determined for addition of maleic anhydride, a set schedule may be followed without analysis.

When the anhydride has been graft-copolymerized, the final copolymer may be isolated if desired, as by precipitation or by vaporization of volatile solvent. Volatile solvent may be replaced with a relatively non-volatile solvent. The solution of copolymer is mixed with the non-volatile liquid and the mixture heated. Temperatures of 100° to 200° C. may be used and pressure may be lowered as to 5 to 30 mm. (Hg). In this way, residual monomers are also removed and catalyst decomposed. Even if copolymerization is effected in an oil such as an inert white mineral oil, it usually is desirable to heat the reaction mixture to 140° to 150°

C. at 5 to 50 mm. pressure to remove volatile material and decompose traces of initiator.

Further details are disclosed in the illustrative examples which follow. Parts are by weight unless otherwise designated. In the examples effective methods of preparation of graft copolymers of this invention are described. The variety of monomers which may be used is indicated. Properties of resulting graft copolymers are presented.

EXAMPLE 1

Apparatus is prepared from a round bottom, 3-necked flask equipped with gas inlet tube, reflux condenser, stirrer, thermometer, and addition funnel. There are mixed 90 parts of cetyl-stearyl methacrylate, 122.2 parts of lauryl-myristyl methacrylate (98% pure by saponification number), 15 parts of white mineral oil, and 1.5 parts of a 50% diisopropylbenzene hydroperoxide solution in alcohol and ketone. About 30% of this mixture is charged to the flask together with 0.3 part of a 25% solution of diisobutylphenoxyethoxyethyldimethylbenzylammonium chloride monohydrate in n-hexyl-alcohol. The apparatus is swept out with nitrogen and the charge is heated to 105° C. and thereafter held at about this temperature. Reaction time is counted from the moment when the temperature reaches 105° C. After 20 minutes the rest of the mixture is gradually added over a period of 100 minutes. At this time about 70% of the mixture has been polymerized. There is prepared a mixture of 81 parts of ethyl acrylate, 9 parts of maleic anhydride, 0.45 part of a 50% solution of diisopropylbenzene hydroperoxide, and 0.09 part of a 25% solution of diisobutylphenoxyethoxyethyldimethylbenzylammonium chloride in hexanol. This is gradually added from 2.25 to 3.0 hours after the start of polymerization. At 3.67 hours additions are made of 0.3 part of 50% solution of diisopropylbenzene hydroperoxide, 0.06 part of a 25% solution of the above quaternary ammonium salt, and 150 parts of white mineral oil. At 5.00 hours additions are made of 0.45 parts, 0.09 part, and 15 parts of the above materials respectively. They are again added at 5.67, 6.33, and 7.00 hours in the same amounts. At 7.5 hours addition is made of about 200 parts of a 100 neutral oil. The reaction mixture is then heated to 135° C. under 5 mm. (Hg) pressure with removal of 75 parts of volatile material. The reaction mixture is then diluted with 260 parts of 100 neutral oil to give a 30% solution of copolymer. This solution has a viscosity of 378 cs. at 210° C.

This concentrate is blended with a 170 S.U.S. neutral oil (solvent extracted midcontinent) to give a blend containing 1% of copolymer. The viscosity of the blend is 6.66 cs. at 210° F. and 42.45 cs. at 100° F. giving a viscosity index of 119. The 170 neutral oil has a viscosity index of 100. This blend is tested for dispersancy by the asphaltenes test. The blend readily disperses 0.2% of asphaltenes in this lubricating oil at 90° C. and at 150° C. The copolymer can be diluted to 0.25% and still disperse 0.2% of asphaltenes at 150° C. while a 0.125% solution of copolymer in oil still disperses 0.2% of asphaltenes at 90° C. The blend completely disperses 0.4% of asphaltenes at 150° C. These data show effective dispersing action for this copolymer.

A blend is made in a 100 S.U.S. netural oil to have a copolymer content of 1%. This copolymer lowers the pour point of 5° F. for this oil to −25° F. in the blend.

In a C.R.C. FL–2 engine test, this copolymer at a concentration of 1% together with 1% of zinch dialkyldithiophosphate gives a sludge rating of 61.0 and a varnish rating of 11.7. The oil with only the zinc alkyldithiophosphate gives ratings of 46.8 and 7.4 respectively The abbreviation C.R.C. refers to the Coordinating Research Council. The FL–2 engine test follows a prescribed set of conditions for the study of fuels and lubricants. In these tests the fuel is held constant. A six-cylinder Chevrolet engine is operated at constant load and speed for 40 hours. At the conclusion of the run the engine is disassembled and engine parts are rated for deposits. It is usual to evaluate deposits of sludge on some parts and varnish on others and to consider the total sum of ratings. The maximum rating would be 100 for a perfect engine.

For purposes of comparison, a copolymer was prepared with the same monomers as used above in the same proportion. In this case, however, the 90 parts of cetyl-stearyl methacrylate, 122.2 parts of lauryl-myristyl methacrylate, 81 parts of ethyl acrylate, 9 parts of maleic anhydride, and 15 parts of white mineral oil were mixed at the start. The same proportions and schedule of additions of hydroperoxide and quaternary ammonium salt were followed. The final copolymer was adjusted to a concentration of 30% in mineral oil. The resulting product has a viscosity of 171 cs. at 210°. A blend of this copolymer in 170 S.U.S. neutral oil gives viscosity of 6.74 cs. at 210° F. and 41.86 cs. at 100° F. corresponding to a viscosity index of 124. A 1% blend of this copolymer in the test 100 S.U.S. neutral oil depressed the pour point from 5° F. to −20° F. While these properties are useful, this copolymer is lacking in dispersing action. It failed to disperse asphaltenes at 0.2% of asphaltenes in a test blend even at a concentration of 2% of copolymer whether the temperature was 90° C. or 150° C.

EXAMPLE 2

The apparatus described in Example 1 is used and the method thereof is followed. The initial mixture consists of 90 parts of cetyl-stearyl methacrylate, 122.2 parts of lauryl-myristyl methacrylate of 98% purity, 15 parts of white mineral oil, and 1.5 parts of a 50% solution of diisopropylbenzene hydroperoxide. This mixture is treated with 0.3 part of a 25% solution of diisobutylphenoxyethoxyethyldimethylbenzylammonium chloride and heated to about 105° C. and maintained at this temperature level. At the end of two hours about 73% of the mixture has polymerized. Addition is thereafter made of a mixture of 85.5 parts of ethyl acrylate, 4.5 parts of maleic anhydride, 0.45 part of 50% solution of diisopropylbenzene hydroperoxide, and 0.09 part of a 25% solution of the above quaternary ammonium salt. As graft copolymerization is continued, additional initiator and activator are added to a total of 4.05 parts and 0.81 part of the respective solutions. Additions are made of 45 parts of white mineral oil and 265 parts of 100 neutral oil. After 7 hours the reaction mixture is heated to about 145° C./5 mm. to give a solution containing 42.4% of copolymer. It has a viscosity of 3,536 cs. at 210° F. A 30% solution has a viscosity of 700 cs. at 210° F.

The more concentrated oil solutions of the test 170 S.U.S. neutral oil are mixed to give a blend containing 1% of the copolymer. This blend has viscosities of 6.73 cs. and 42.89 cs. at 210° F. and 100° F. respectively. The viscosity index of the blend is 120.

In standard tests for dispersancy a solution containing 0.125% of the copolymer readily disperses 0.2% of asphaltenes in oil at 90° C. and also at 150° C. A blend containing 0.25% of the copolymer readily disperses 0.4% of asphaltenes at 150° C.

In the ASTM pour point test a blend of the copolymer in the test 100 S.U.S. neutral oil gives a pour point of −25° F. This is a depression of 30° from the pour point of this neutral oil without copolymer.

For purposes of comparison the same monomers used above were all mixed at the start in the same proportions as given above. The polymerization schedule was then paralleled to give a concentrate of copolymer in oil. This concentrate was adjusted to a solution of 30% of copolymer which then gave a viscosity of 180 cs. at 210° F. A 1% blend of the copolymer in the test 170 S.U.S. neutral oil gave viscosities of 6.79 cs. and 42.00 cs. at 210 and 100° F. respectively, corresponding to a viscosity index of 125. In the 100 S.U.S. neutral oil the copolymer depressed the pour point to −35° F. This copolymer, however, failed to disperse asphaltenes at either 90° C. or 150° C.

EXAMPLE 3

The procedure of Example 2 is followed with substitution of azobisisobutyronitrile for the hydroperoxide and activator. The catalyst in the first mixture amounts to 0.75 part and in the later added mixture to 0.3 part. Thereafter there is added in small increments a total of 2 parts of this catalyst. The temperature of polymerization is held at about 90° C. the final product is a solution in oil of 30% of copolymer. This solution has a viscosity of 264 cs. at 210° F.

A blend of 1% of this copolymer in 170 S.U.S. neutral oil gives a viscosity of 7.93 cs. and 56.12 cs. at 210° F. and 100° F. respectively. The viscosity index of this blend is 115.

In the standard asphaltenes test this copolymer at 0.25% disperses 0.2% of asphaltenes at 90° C. and at 0.5% disperses 0.2% of asphaltenes at 150° C. A 1% solution of the copolymer in the test blend readily disperses 0.4% of asphaltenes at 150°. This copolymer provides a depression of pour point of the test 100 S.U.S. neutral oil of 10° F.

EXAMPLE 4

The procedure of Examples 2 and 3 is followed, but with substitution of di-tert-butyl peroxide for the above catalysts and use of temperatures of 110°–115° C. The total amount of catalyst used amounts to 1.08% by weight of the comonomers. The product is a solution containing 30% of graft copolymer in oil and having a viscosity of 3230 cs. at 210° F.

A blend of 1% of this copolymer gives a viscosity of 8.96 cs. at 210° F. and 61.81 cs. at 100° F., corresponding to a viscosity index of 125.

In the standard asphaltenes test this copolymer disperses 0.2% of asphaltenes at 90° or 150° C. when only 0.25% of copolymer is present.

A blend containing 1% of this copolymer in a test 100 S.U.S. neutral oil depresses the pour point from 5° F. to −20° F.

EXAMPLE 5

The procedure of Examples 2 to 4 is followed but with substitution of benzoyl peroxide for the above catalysts and use of temperatures of 81° to 101° C. The final product is a solution containing 30% of copolymer and having a viscosity of 1643 cs. at 210° F.

A blend containing 1% of this copolymer in 170 neutral oil gives a viscosity of 8.71 cs. at 210° F. and 57.64 cs. at 100° F. corresponding to a viscosity index of 118.

In the standard asphaltenes test a blend containing 0.25% of this copolymer disperses 0.2% of asphaltenes at 90° C. and a blend containing 0.5% of copolymer disperses 0.2% of asphaltenes at 150° C. A blend containing 0.5% of copolymer readily disperses 0.4% of asphaltenes at 150° C.

In the ASTM pour point test a blend of the copolymer in the test 100 neutral oil has a pour point of −25° F., a depression of 30°.

EXAMPLE 6

By the same general procedure a mixture of 153.5 parts of cetyl-stearyl methacrylate of 97.8% purity, 84.4 parts of lauryl-myristyl methacrylate of 97.7% purity, 15 parts of oil and 1.5 parts of 50% solution of diisopropylbenzene hydroperoxide in alcohol and ketone activated with 0.075 part of lauryldimethylbenzylammonium chloride in hexanol is heated at 105°–110° C. After polymerization has exceeded 70%, there is gradually added a mixture of 4.5 parts of maleic anhydride, 13.8 parts of lauryl-myristyl methacrylate, 49.5 parts of methyl acrylate, 0.34 part of 50% solution of diisopropylbenzene hydroperoxide, and 0.02 part of the above quaternary in hexanol.

The incremental additions of initiator, activator, and oil are 1.65, 0.33, and 37.5 parts respectively. After 5 hours of polymerization at 105–110° C., temperature is held at 100° C. for another 2.5 hours. The batch is stripped of volatile materials at 140° C./5 mm., whereupon 518 parts of oil is added. The final product is a solution containing 52% of copolymer and having a viscosity of 4,237 cs. at 210° F. At 30% of copolymer in the oil the viscosity is 490.8 cs. at 210° F.

A blend containing 2% of this copolymer in 170 neutral oil gives a viscosity of 8.15 cs. at 210° F. and 52.05 cs. at 100° F. corresponding to a viscosity index of 129. In the standard asphaltenes test only 0.06% of this copolymer is necessary to disperse 0.2% of asphaltenes in oil at 90° C. At 150° C. 0.125% of this copolymer disperses 0.2% of asphaltenes, while at 150° C. 1% of this copolymer readily disperses 0.4% of asphaltenes in oil.

A blend of 1% of this copolymer in the test 100 neutral oil gives a pour point depression of 10° F.

EXAMPLE 7

The procedure of Example 1 is followed with substitution of 81 parts of butyl acrylate for the ethyl acrylate. The product is a solution of the graft copolymer and oil, the copolymer content being 30% and the viscosity of this solution being 216.5 cs. at 210° F.

A blend of 1% of this copolymer in the test 170 neutral oil gives a viscosity of 6.55 cs. at 210° F. and 41.78 cs. at 100° F. corresponding to a viscosity index of 118. A test blend containing 0.5% of this copolymer disperses 0.2% of asphaltenes at 90° F. A 1% blend in test 100 neutral oil gives a pour point of −20° F.

EXAMPLE 8

The above procedure is followed with a starting mixture of 90 parts of cetyl-stearyl methacrylate, 120 parts of lauryl-myristyl methacrylate, and 15 parts of styrene in oil, initial polymerization at 110° C. being carried to over 80% with cumene hydroperoxide as initiator and didodecenyldimethylammonium chloride as activator in the above proportions. Thereafter a mixture of 66 parts of ethyl acrylate and 9 parts of maleic anhydride is gradually added. Additional initiator and activator are added incrementally as above. The product is a solution in oil of 30% of copolymer with a viscosity of 429 cs. at 210° F.

A blend containing 1% of the copolymer in the test 170 neutral oil gives a viscosity of 6.84 cs. at 210° and 43.86 cs. at 100° F. corresponding to a viscosity index of 120. A blend containing 0.5% of copolymer readily disperses 0.2% of asphaltenes at 150° C. and a 0.125% blend disperses 0.2% of asphaltenes at 90° C. A blend containing 1% of copolymer in test 100 neutral oil has a pour point of −20° F.

EXAMPLE 9

The above procedure is followed, starting with a mixture of 153.5 parts of cetyl-stearyl methacrylate of 97.8% purity, 84.4 parts of lauryl-myristyl methacrylate of 97.7% purity, 25 parts of methyl methacrylate, 15 parts of white mineral oil, and 1.5 parts of diisopropylbenzene hydroperoxide activated with 0.08 part of isooctylcresoxyethoxyethyldimethylbenzylammonium chloride in hexanol. Polymerization is effected at 105°–110° C. until about 80% of the monomers have copolymerized. There is slowly added a mixture of 4.5 parts of maleic anhydride, 13 parts of lauryl methacrylate, 24.5 parts of methyl methacrylate, 0.18 part of the above initiator in 50% solution, and 0.02 part of the above quaternary in hexanol. Incremental additions are made of 1.7 parts, 0.33, and 38 parts of initiator, activator, and oil, respectively. After 5 hours the temperature is reduced to about 100° C. for 2.5 hours. After the product is stripped at 140° C./5 mm., it is diluted with 520 parts of 100 neutral oil to give a 50.2% solution of copolymer with a viscosity of 753 cs. at 210° F.

A test blend containing 2% of this copolymer has a viscosity of 7.82 cs. at 210° F. and 49.38 cs. at 100° F. This corresponds to a viscosity index of 128. A blend containing 0.2% of this copolymer disperses 0.2% of asphaltenes at both 90° and 150° C. while a 1% solution disperses 0.4% of asphaltenes at 150° C. A 1% blend in test 100 neutral oil gives pour point depression of 10° F. For purposes of comparison a copolymer was prepared from the same monomers in the ratios shown above. The schedules for addition of initiator were paralleled, but the molecular weight was considerably increased. The product was a solution of 45.6% of copolymer in oil. It had a viscosity of 3213 cs. at 210° F. A 2% blend of this copolymer in 170 neutral oil had viscosities of 9.44 cs. and 52.61 cs. at 210° F. and 100° F., respectively. This corresponds to a viscosity index of 145. A blend of 2% of this copolymer is necessary for giving indications of dispersing asphaltenes at 90° F. The pour point of a 1% blend in 100 neutral oil was −25° F.

EXAMPLE 10

The above procedure is followed. The initial mixture comprises 210 parts of cetyl-stearyl methacrylate, 285 parts of lauryl-myristyl methacrylate, 90 parts of ethyl acrylate, 35 parts of oil and 1.8 parts of diisopropybenzene hydroperoxide. After this mixture is heated to 105° C., addition is made of 0.2 part of diisobutylphenoxyethoxyethyldimethylbenzylammonium chloride in hexanol. After 2.25 hours, this charge is 72% polymerized. Addition is then begun of a mixture of 92 parts of ethyl acrylate, 14 parts of N-vinyl-2-pyrrolidinone, 14 parts of maleic anhydride, 1.05 parts of a 50% solution of diisopropylbenzene hydroperoxide, and 0.2 part of a 25% solution of the above quaternary. Additions are made of initiator solution, activator solution, and oil to totals of 4.9, 0.98, and 70 parts respectively with final additions of 105 and 489 parts of 100 neutral oil. Sufficient oil is supplied to give a concentrate of 30% of graft copolymer. It has a viscosity of 394 cs. at 210° F.

A blend containing 1% of this copolymer in 170 neutral oil has viscosities of 6.67 cs. and 43.11 cs. at 210° F. and 100° F. respectively, corresponding to a viscosity index of 121. In the standard asphaltenes test only 0.06% of this copolymer is necessary to disperse 0.2% of asphaltenes at 90° C., while 0.25% of copolymer disperses 0.2% of asphaltenes at 150°. At 150°, 0.5% of copolymer disperses 0.4% of asphaltenes. A 1% blend of copolymer in 100 neutral oil has a pour point of −15° F.

In a CRC FL–2 engine test, this copolymer gives a sludge rating of 65.5 and a varnish rating of 12.6 for a total rating of 78.1. The total rating for the oil without copolymer but with 1% of zinc dialkyldithiophosphate is 54.2.

EXAMPLE 11

By the same method a mixture of 120 parts of vinyl stearate, 20 parts of vinyl acetate, 8 parts of a 50% solution of diisopropylbenzene hydroperoxide, and 2 parts of a 25% solution of the quaternary ammonium salt used in Example 10 is polymerized at 105° C. for 2.25 hours, by which time about 60% of polymer has formed. There are added increments of a mixture of 6 parts of maleic anhydride, 44 parts of ethyl acrylate, 2.4 parts of a 50% diisopropylbenzene hydroperoxide solution, and 0.5 part of 25% quaternary ammonium chloride solution. Five additions of the same initiator and activator solutions are made together with additions of toluene, the totals being 1.12, 0.56, and 100, respectively. After 7.5 hours, 78 parts of toluene is supplied and at 8 hours heating is discontinued. The final solution contains 40.5% of graft copolymer. The yield of copolymer is 74.5%. A portion of the product is adjusted to a copolymer content of 30%. This solution has a viscosity of 62.1 cs. at 100° F.

In the standard asphaltenes tests, a 0.5% blend of this copolymer in oil disperses 0.2% of asphaltenes at both 90° and 150° C.

EXAMPLE 12

A mixture is prepared from 35 parts of cetyl-stearyl methacrylate, 35 parts of lauryl-myristyl methacrylate, 3 parts of 7,7 - dimethyl - 5-methylene-2,3,5,6-tetrahydro-[7H]-pyrrolo-(1,2,-a)-imidazole, 10 parts of toluene, and 0.7 part of azobisisobutyronitrile. About 30% of this mixture is charged to a reaction vessel which is blanketed with nitrogen and heated with an oil bath. Time is counted from the moment that a temperature of 85° C. is reached. Shortly thereafter, heat of polymerization provides a surge in temperature of about 20° C., but thereafter, the polymerizing mixture is held at about 85° C. After about 20 minutes, the balance of the above mixture is gradually charged. At the end of two hours, about 75% of the mixture has polymerized. After 2.25 hours, there is begun addition of a mixture of 25 parts of ethyl acrylate, 2 parts of maleic anhydride, 5 parts of toluene, and 0.3 part of azobisisobutyronitrile. Addition is completed within an hour. At 3.67 hours, there is added a solution of 0.2 part of azobisisobutyronitrile in 5 parts of toluene. Over the next 3 hours, 4 additions are made of 0.3 part of this catalyst each in 5 parts of toluene. Heating is discontinued after 7.67 hours. The reaction mixture is diluted with 50 parts of toluene to give a final solution containing 47.9% of graft copolymer. A solution adjusted with toluene to a copolymer content of 30% has a viscosity of 79.9 cs. at 100° F.

In the standard asphaltenes test at 150° C. 0.5% of a blend of this copolymer readily disperses 0.4% of asphaltenes. A 1% blend in 170 neutral oil gives viscosities of 6.12 and 38.5 at 210° F. and 100° F. respectively corresponding to a viscosity index of 114. A 1% blend in 100 neutral oil gives a pour point depression of 15° F.

EXAMPLE 13

The procedures used above are followed by starting with a mixture of 10 parts of lauryl methacrylate, 40 parts of stearyl methacrylate, 12 parts of di(lauryl-myristyl) fumarate, and 0.588 part of 85% of tert-butyl perbenzoate with 45 parts of toluene. After polymerization for two hours in the range of 105° to 118° C., there is gradually added a solution of 3 parts of maleic anhydride and 0.18 part of 85% tert-butyl perbenzoate in 35 parts of ethyl acrylate. As polymerization progresses, there are made four additions of the same initiator in toluene for a total of 0.66 part of tert-butyl perbenzoate and 60 parts of toluene. Heating is discontinued after 7.5 hours. The product is a 44.1% solution of graft copolymer. The viscosity of a 30% solution in toluene is 1349 cs. at 100° F. The copolymer readily disperses asphaltenes at 90° and 150° C. to a dilution of 0.125%.

An oil solution of the copolymer is prepared by stripping 182 parts of the 44% solution with 150 parts of 100 S.U.S. neutral oil on stirring and heating to 130° C./5 mm. and holding at 130° C./5 mm. for one hour. The stripped sample is diluted with an additional 14.2 parts of 100 S.U.S. neutral oil to adjust the final concentrate to 30% of graft copolymer.

A 0.062% solution of this copolymer in 170 neutral oil disperses 0.2% of asphaltenes at 90° C.

A conventional copolymer made by mixing all monomers at the start and following a similar polymerization schedule gives a copolymer which requires at least 2% to show any dispersancy of asphaltenes in oils.

EXAMPLE 14

(a) In the same general way, there are used 30 parts of stearyl methacrylate, 40 parts of lauryl methacrylate, 5 parts of white mineral oil, and 0.5 part of a 50% solution of diisopropylbenzene hydroperoxide. Part of this mixture is heated to 105° C. and treated with 0.1 part of 30% solution of diisobutylphenoxyethoxyethyldimethylbenzylammonium chloride. The rest of the mixture is slowly added. When polymerization has reached about 75%, addition is slowly made of a solution of 3.4 parts of itaconic anhydride in 26.6 parts of ethyl acrylate. More initiator, activator, and oil are supplied as in Example 1. The product is a 30% solution of graft copolymer in oil having a viscosity of 98 cs. at 210° F.

(b) Copolymer of cetyl-stearyl methacrylate:lauryl-myristyl methacrylate:methyl methacrylate:itaconic anhydride in a ratio of 50:31.6:15:3.4 by weight.

The copolymerization apparatus described in Example 1 is used for polymerizing a mixture of 153.2 parts of cetyl-stearyl methacrylate, 96.7 parts of lauryl-myristyl methacrylate, 15 parts of white mineral oil, and 1.5 parts of 50% diisopropylbenzene hydroperoxide solution in alcohol and ketone as furnished commercially. The mixture is fed into the reaction vessel during 2 hours. Activator is charged with the initial catalyzed monomeric mixture amounting to 0.3 part of n-hexanol solution containing 25% by weight of diisobutylphenoxyethoxyethyldimethylbenzylammonium chloride monohydrate. The batch temperature is maintained at 110° C. during the entire heating period and nitrogen is passed through the polymerization vessel during the entire copolymerization cycle. Fifteen minutes after the above catalyzed monomeric mixture has been charged to the reaction vessel, the addition of a second catalyzed monomeric mixture is made over 45 minutes. This mixture consists of 45 parts of methyl methacrylate, 10.2 parts of itaconic anhydride, 0.34 part of 50% solution of diisopropylbenzene hydroperoxide, and 0.07 part of 25% solution of diisobutylphenoxyethoxyethyldimethylbenzylammonium chloride monohydrate. Forty minutes after completion of the addition of this catalyzed and activated monomeric mixture there is charged 0.6 part of additional 50% solution of the hydroperoxide and 0.12 part of 25% solution of quaternary ammonium chloride with 7.5 parts of white mineral oil. Other incremental additions of hydroperoxide solution containing 50% active ingredient of quaternary ammonium chloride solution at 25% strength, and of white mineral oil are made at 5, 5.67, and 6.33 hours to a total of 1.5 parts of a 50% solution of diisopropylbenzene hydroperoxide in alcohol and ketone, 0.21 part of 25% solution of diisobutylphenoxyethoxyethyldimethylbenzylammonium chloride monohydrate in n-hexanol, and 22.5 parts of mineral oil. At 7 hours, the flow of inert gas is stopped. Four hundred parts of 100 S.U.S. neutral oil is charged and the batch is heated to 140° C. under a reduced pressure of 5 mm. for one hour. There results an oil solution containing 38.5% of graft copolymer. At 210° F., the viscosity of this solution of copolymer is 360.2 cs. A blend of 2% of this copolymer in a 170 S.U.S. neutral oil shows a viscosity index of 126.

A 100 S.U.S. oil blend containing 1% of copolymer effectively disperses 0.4% of asphaltenes at 150° C. At 90° C., this copolymer at 0.125% disperses 0.2% of asphaltenes in oil. Another oil blend of 1% polymer in a 100 S.U.S. neutral oil shows an ASTM pour depression of 10° F.

EXAMPLE 15

(a) The same general procedure is followed starting with a mixture of 150.8 parts of cetyl-stearyl methacrylate, 84.4 parts of 97.7% pure laury-myristyl methacrylate, and 1.5 part of 50% diisopropylbenzene hydroperoxide solution. This initiator is activated with the quaternary salt used above. When about 80% of this mixture has polymerized, there is supplied over the course of about an hour a solution of 30 parts of maleic anhydride, 30 parts of methyl acrylate, 7.67 parts of 97.7% pure lauryl-myristyl methacrylate, 40 parts of methyl ethyl ketone, 0.07 part of the same quaternary salt solution, and 0.34 part of 50% diisopropylbenzene hydroperioxide solution. During polymerization, oil to a total of about 400 parts by volume, 2.1 parts of initiator solution, and 0.07 part of activator solution are added. Polymerization at about 105° C. is continued for 7.5 hours. The batch is stripped by heating to 140° C. at 5 mm. pressure. Oil is added to bring the copolymer content to 30%. This solution has a viscosity of 192.6 cs. at 210° F. The copolymer readily disperses asphaltenes in oil at 90° C. and 150° C.

(b) The above procedure is repeated with a ratio of 50 parts of cetyl-stearyl methacrylate, 30 parts of lauryl-myristyl methacrylate, 10 parts of methyl methacrylate, and 10 parts of maleic anhydride. The copolymer is precipitated and analyzed for its maleic content, which is found to be 7.98%. A 30% solution of this graft copolymer in oil has a viscosity of 227 cs. at 210° F. A 2% blend in 170 S.U.S. oil has viscosities of 7.64 cs. and 49.66 cs. at 210° F. and 100° F. respectively, corresponding to a viscosity index of 124. The pour point of the test 100 neutral oil is depressed from 5° F. to —15° F. with 1% of this copolymer. This copolymer at 2% disperses asphaltenes in oil at 90° and 150° C.

EXAMPLE 16

Copolymer of cetyl-stearyl methacrylate:isodecyl methacrylate:ethyl acrylate:maleic anhydride in a ratio of 30:42:25:3 by weight.

With the apparatus described in the above example a monomeric mixture is prepared for the base polymer, consisting of 90 parts of cetyl-stearyl methacrylate, 126 parts of isodecyl methacrylate, 15 parts of mineral oil, 1.5 parts of diisopropylbenzene hydroperoxide, 50% solution in alcohol and ketone. The initial activator is the same as in Example 1 and the same procedure is followed. The catalyzed and activated delayed addition which is charged between 2.25 and 3 hours consists of 75 parts of ethyl acrylate, 9 parts of maleic anhydride, 0.42 part of 50% solution of diisopropylbenzene hydroperoxide in alcohol and ketone, and 0.08 part of 25% solution of diisobutylphenoxyethoxyethyldimethylbenzylammonium chloride monohydrate in n-hexanol. Incremental additions of the 50% solution of hydroperoxide, of the 25% solution of quaternary ammonium chloride, and of mineral oil are made during the course of the copolymerization, totaling 2.1, 0.42, and 75 parts by weight, respectively. After a total heating period of 7.5 hours, the batch is stripped at 135° C./5 mm. for one hour to remove volatile matter, then diluted with sufficient (510 parts) of 100 S.U.S. neutral oil to make a concentrate containing 30% of graft copolymer. This solution has a viscosity at 210° of 432 cs.

A 1% blend in 170 S.U.S. neutral oil has a viscosity of 6.94 cs. at 210° F. and 44.51 cs. at 100° F., corresponding to a viscosity index of 121. This copolymer disperses 0.2% of asphaltness at 0.125% at 90° C. A 1% blend in 100 S.U.S. oil lowers the pour point from 5° F. to —45° F.

EXAMPLE 17

Copolymer of lauryl acrylate:ethyl acrylate:maleic anhydride in a ratio of 70:27:3 by weight.

The procedure for the preparation of a graft copolymer described is again followed. A monomeric mixture for the base polymer is prepared using 35 parts of lauryl acrylate, inhibited with 100 p.p.m. of monomethyl ether of hydroquinone, 25 parts of toluene, and 1 part of 50% solution of diisopropylbenzene hydroperoxide in alcohol and ketone. This monomeric mixture is charged to the polymerization vessel during two hours with addition of 0.2 part of 25% n-hexanol solution of diisobutylphenoxyethoxyethyldimethylbenzylammonium chloride monohydrate as activator.

The monomeric mixture used for delayed addition and charged to the reaction vessel at 2.25 to 3 hours consists of 13.5 parts of ethyl acrylate, inhibited with 200 p.p.m. of monomethyl ether of hydroquinone, 1.5 parts of maleic anhydride, 0.3 parts of 50% solution of diisopropylbenzene hydroperoxide in alcohol and ketone, and 0.06 part of 25% solution of diisobutylphenoxyethoxyethyldimethylbenzylammonium chloride monohydrate in n-hexanol.

Incremental additions of the 50% solution of the hydroperoxide, of the 25% solution of the quaternary ammonium chloride, and of toluene are made beginning 40 minutes after all of the second monomeric mixture has been charged to the polymerization vessel. They total 1.4 parts, 0.28 part, and 26.1 parts by weight, respectively. The batch temperature is kept at 104–106° C. during the entire copolymerization cycle. At 8 hours, heating is stopped. Analysis shows the product to be a 46.2% solution of graft copolymer. A toluene solution containing 30% of copolymer at 100° F. shows a viscosity of 19.5 cs.

To 73 parts of the toluene solution containing 46.2% of graft copolymer is added 30 parts of 100 S.U.S. neutral oil. This mixture is stirred and heated to 130° C./5 mm. and kept at 130° C./5 mm. for one hour to remove volatile matter. The concentrate is diluted with 54.7 parts of 100 S.U.S. neutral oil to give an oil solution containing 30% of copolymer.

A 0.0625% blend of this copolymer in oil disperses 0.2% of asphaltness at 90° C.

EXAMPLE 18

Copolymer of cetyl - stearyl methacrylate:lauryl-myristyl methacrylate:di - n - butyl itaconate:ethyl acrylate:maleic anhydride in ratios to 40:10:12:35:3 by weight.

A round bottom flask is equipped for copolymerization as described for Example 11.

The catalyzed monomeric mixture for the base polymer consisted of 40 parts of cetyl-stearyl methacrylate, 10 parts of lauryl-myristyl methacrylate, 12 parts of di-n-butyl itaconate, 0.588 part of tert-butyl perbenzoate, 85% in xylene, and 10 parts of toluene.

This mixture is charged over a two-hour period to the reaction vessel, using a nitrogen atmosphere. The batch temperature is kept as 107–110° C. The monomeric mixture for the catalyzed delayed addition during 45 minutes from 2.25 to 3.0 hours consists of 35 parts of ethyl acrylate inhibited with 200 p.p.m. of monomethyl ether of hydroquinone, 3 parts of maleic anhydride, 0.18 part of tert-butyl perbenzoate, 85% in xylene, and 17.4 parts of toluene. As soon as addition of this catalyzed mixture has been completed, 17.4 parts of additional toluene is added. Incremental additions of 85% tert-butyl perbenzoate in xylene and diluted with toluene are made beginning 40 minutes after completing the catalyzed delayed addition at 3 hours and totaling 0.84 part of 85% solution of tert-butyl perbenzoate and 78.3 parts of toluene. There results 238.9 parts of solution which contains by analysis 36.9% of graft copolymer. The viscosity of a toluene solution containing 30% of copolymer is 1600 cs. at 210° F.

To a stripping flask is added 161.5 parts of the 36.9% copolymer solution with 100 parts of mineral oil. This charge is stirred and heated to 130° C./5 mm. and kept at 130° C./5 mm. for one hour to remove volatile matter. An additional 132.5 parts of mineral oil is then added to reduce the copolymer concentration in oil to 20%. This concentrate provides a facile way to handle the copolymer in making blends in lubricating oils, synthetic lubricants, hydraulic fluids, fuel oils, and gasolines.

A 0.0625% blend prepared in 100 S.U.S. neutral oil disperses 0.2% of asphatenes at 90° C.

EXAMPLE 19

The type apparatus described in Example 1 is used. The initial charge consists of 90 parts of cetyl-stearyl methacrylate, 122 parts of lauryl-myristyl methacrylate, 41 parts of ethyl acrylate and 15 parts of white mineral oil. The schedule of Example 1 is followed. After two hours 9 parts of maleic anhydride is added to the polymerizing mixture and the addition funnel is rinsed with 40 parts of ethyl acrylate containing 0.3 part of 50% diisopropylbenzene hydroperoxide and 0.06 part of 25% quaternary ammonium salt. This is followed by 150 parts of white mineral oil. Polymerization is carried out as in Example 1. The batch is stripped at 130° C./5 mm. for an hour. The product is adjusted with 232 parts of 100 neutral oil to give a 30% solution of graft copolymer having a viscosity of 426.1 cs. at 210° F.

Examination of this copolymer for dispersancy shows it to be unusually effective. A 0.0625% solution in 100 neutral oil disperses 0.2% of asphaltenes at 90° C.

EXAMPLE 20

Copolymers of cetyl-stearyl methacrylate:lauryl-myristyl methacrylate:ethyl acrylate:maleic anhydride in a ratio of 30:40:27:3 by weight.

The same quantity of materials and the same procedure as given in Example 1 are used in carrying out the preparation of this copolymer except that two solutions are added as delayed additions during 2.25 to 3 hours in the course of the copolymerization. One solution consists of 81.0 parts of ethyl acrylate, 0.45 part of 50% diisopropylbenzene hydroperoxide solution as furnished commercially, and 0.09 part of 25% solution of di - isobutylphenoxyethoxyethyldimethylbenzylammonium chloride monohydrate in n-hexanol. The other solution consists of 9 parts of maleic anhydride in 10 parts of methyl ethyl ketone. The batch is stirred and heated at 130° C./5 mm. for one hour. There results 573 parts of reaction product to which an additional 327 parts of 100 S.U.S. neutral oil is added to make an oil solution containing 30% of graft copolymer.

The concentrate in oil has a viscosity of 208.7 cs. at 210° F.

In the dispersancy test a blend containing 0.0625% of graft copolymer in oil disperses 0.2% of asphaltenes at 150° C.

In the examples there has been shown a preferred way for introducing maleic anhydride by dissolving it in a polymerizable vinylidene monomer. The acrylic esters having alkyl groups of one to eight carbon atoms are especially suitable for this purpose and of these the alkyl acrylates and methacrylates having alkyl groups of one to four carbon atoms are most suitable. Use of the latter seems to augment the action of the maleic anhydride and final graft copolymers then possess excellent properties.

The addition of maleic anhydride may also be effected, as has been mentioned, in an inert organic solvent such as butyl or ethyl acetate, acetone, methyl ethyl ketone, or toluene or mixtures of solvents. Furthermore, although as a somewhat less convenient method, maleic anhydride may be admixed as a solid, which is then dissolved in the polymerizing mixture and reacted therewith or a suspension in a solvent for monomers and/or polymers may be admixed.

The anhydride groups which are introduced onto a base polymer are particularly suitable for reaction with alcohols, amines, other bases including ammonia, or mercaptans.

While it has already been proposed to modify conventional maleic copolymers by reaction with such agents, the behavior of the present graft copolymers is often different in the nature of the final reaction products. For instance, conventional copolymers often gel during post reactions, whereas the graft copolymers remain soluble.

The graft copolymers which are prepared as has been illustrated by the examples vary in molecular weight from 10,000 to over 1,000,000 as viscosity average values.

Copolymers of this invention are useful as additives for lubricating oils. They improve one or more properties thereof, such as increase of viscosity index or lowering of pour point, and at the same time supply dispersancy and detergency. Lubricating oils include oils varying in viscosity from spindle oils to reciprocating aircraft engine oils and gear oils. Oils for sparking ignition and compression ignition engines are commonly sold under grade designations of SAE 10 to 50 and include so-called "multiple branded" oils which are made possible through use of copolymers which include those of this invention. Other types of lubricants in which copolymers of this invention may be used include hydraulic fluids, automatic transmission fluids and greases. While these lubricants are commonly based on petroleum or mineral oils, comparable lubricants are also based on so-called synthetic lubricants which include oily esters, polyethers, silicone fluids, and the like.

Usually, lubricants will contain from about 0.1% to about 15% of one or more graft copolymers of this invention or copolymers which include a graft copolymer of this invention. A graft copolymer of this invention may be used, for example, to supply dispersing action and to improve the viscosity-temperature relationship and another copolymer used to lower the pour point.

The graft copolymers of this invention are also useful in combustible fluids, which include gasoline, fuel oil, solvents, or jet fuels. Fuel oil includes hydrocarbon distillates sometimes designated as kerosene, furnace oil, burner oil, and Diesel fuels and may include jet fuels. Jet fuels may include distillates in the fuel oil range and also blends with distillates which would be classified as gasolines. In fuels usually the concentration of copolymer will fall in the range from 0.001% to 0.1%.

The distillates may be straight-run or cracked oils or mixtures. In their storage and handling there may develop color, sludges, and sediments with deposits on surfaces including screens, orifices, and other parts of equipment for handling, storing, and using these oils. The copolymers are helpful in preventing or alleviating such troublesome developments as can be demonstrated by the panel coker test or the Cities Service test. In the latter test, time for filtering a fuel oil which has been treated with 0.01% to 0.05% of a graft copolymer prepared as above and which has then been subjected to oxidation at 250° F. is greatly reduced as compared to the time for filtering an oxidized control sample.

Another method for demonstrating the value of the graft copolymers of this invention is by the Sundstrand Pump Test. In this test one liter of distillate containing 4 grams of synthetic sludge is treated with a determined amount of the additive under evaluation. The mixture is then circulated throuhg a Sundstrand oil burner pump containing a 100 mesh screen. The sludge which deposits on this screen is collected and weighed. (See Nelson et al., Ind. Eng. Chem. 48, 1892 (1956).)

A fuel oil without additive gives 210 mg. of sludge. When this fuel oil is treated with 0.01% of the graft copolymer of Example 2, the weight of sludge is 25 mg. When the fuel oil contains 0.01% of the graft copolymer of Example 10 the weight of sludge is 5 mg.

As has been indicated, copolymers of this invention may be used in conjunction with other additives, such as anti-oxidants, stabilizers, high temperature detergents, other low temperature dispersants, other viscosity index improvers, other pour point depressants, extreme pressure agents, anti-squawk agents, corrosion inhibitors, other anti-wear agents, foam suppressors, oiliness agents, and other types of oil addtives. Typical of such material are 4,4'-methylenebis-2,6-di-tert-butylphenol, trialkylphenols, tris(dimethylaminomethyl)phenol, phenothiazine, zinc dialkyldithiophosphate, barium dialkyldithiophosphate, nickel dialkyldithiophopshate, calcium, strontium, or barium petroleum sulfonates and alkylnaphthalene sulfonates, alkaline earth alkylphenates, particularly sulfonates and phenates which contain excess proportions of alkaline earth oxides and such basic salts which have been carbonated, alkaline earth salicylates, normal and basic aluminum naphthenates, calcium phenylstearates, alkaline earth salts of diphenol sulfides, alkaline earth salts of alkylphenol-formaldehyde condensates, tricresyl phosphate, chloroalkyl phosphates and phosphites, silicones, alkylphenol-alkylene oxide condensates such as octyl- phenoxyethoxyethoxyethanol or nonylphenoxypolyethoxyethanol, alkylsuccinic anhydride, sulfurized sperm oil, sulfurized terpenes, polyisobutylenes, polymers of acrylic esters, copolymers of dilauryl fumarate and vinyl acetate, copolymers of higher alkyl acrylates or methacrylates and N-vinyl-2-pyrrolidinone, and copolymers of higher alkyl methacrylate and a vinylpyridine.

Typical formulations for lubricating oils follow:

(A) 2% of a copolymer prepared as in Example 1, 2% of a basic calcium petroleum sulfonate, and 1% of zinc dialkyldithiophosphate, all dissolved in a neutral lubricating oil;

(B) 3% of a copolymer prepared as in Example 2, 3% of a basic calcium salt of a diisobutylphenol-formaldehyde condensate, 1% of 4,4'-methylenebis-2,6-di-tert-butylphenol, and a trace of a polymethylsiloxane, all dissolved in a lubricating oil;

(C) 1.5% of a copolymer prepared as in Example 6, 1% of a copolymer of stearyl, lauryl, and butyl methacrylates, 1% of zinc dialkyldithiophosphate, and 0.5% of dibutylcresol, dissolved in a lubricating oil; and (D) 2% of a copolymer prepared as in Example 11, 0.8% of a pour depressing copolymer of stearyl, lauryl, and octyl methacrylates, 1% of polyisobutylene, and 1% of zinc dialkyldithiophosphate.

I claim:

1. A process for preparing oil-soluble dispersant graft cooplymers which comprises first polymerizing under the influence of an azo or peroxidic polymerization catalyst at least one polymerizable monoethylenically unsaturated ester monomer supplying an oil-solubilizing group until about 50% to 90% thereof has polymerized, whereby a mixture of base polymer and monomer is formed, the ester monomer being an alkyl ester of acrylic, methacrylic, itaconic, or fumaric acid, a vinyl ester of an alkanoic acid, or a mixture thereof, then mixing into said mixture of base polymer and monomer a solution, in a monomeric material consisting essentially of at least one $(C_1-C_4)$alkyl acrylate or methacrylate, containing 5% to 50% by weight of at least one itaconic or maleic anhydride, the anhydride added being an amount from 1% to 10% of the weight of the first-mentioned ester monomer used, and copolymerizing the anhydride in the mixture of base polymer and monomer under the influence of an azo or peroxidic polymerization catalyst to form a copolymer having the anhydride grafted on the base polymer, the average size of alkyl group in the first-mentioned ester being at least eight carbon atoms and being sufficiently large to render the anhydride graft copolymer soluble in hydrocarbon lubricating oils.

2. A process according to claim 1 in which the anhydride added amounts to 1 to 5% of the first-mentioned ester.

3. A process according to claim 1 in which the anhydride added amounts to 1.3 to 3% of the first-mentioned ester.

4. A process according to any of claims 1, 2 or 3 in which the polymerization of the first-mentioned ester is effected in a solvent for the base polymer.

5. A process according to claim 1 in which the free radical polymerization initiator comprises a hydroperoxide and a quaternary ammonium salt.

6. A process according to claim 1 wherein a mixture of the ester monomers is polymerized, in which at least one of said ester monomers supplies an oil-solubilizing group, together with a minor proportion of at least one other polymerizable monovinylidiene compound until 50% to 90% thereof has formed base polymer.

7. A process according to claim 1 in which said anhydride is itaconic anhydride.

8. The product of claim 1.

9. The product of claim 6.

10. A process for preparing oil-soluble dispersant graft copolymers having a molecular weight of at least 10,000 viscosity average which comprises first polymerizing in a hydrocarbon oil or a volatile hydrocarbon solvent and under the influence of an azo or peroxidic polymerization catalyst at least one polymerizable monoethylenically unsaturated ester monomer supplying an oil-solubilizing group until about 50% to 90% thereof has polymerized, whereby a mixture of base polymer and monomer is formed, the ester monomer being an alkyl ester of acrylic, methacrylic, itaconic, or fumaric acid, a vinyl ester of an alkanoic acid, or a mixture thereof, then mixing into said mixture of hydrocarbon, base polymer, and monomer a solution, in a monomeric material consisting essentially of at least one ($C_1$–$C_4$)alkyl acrylate or methacrylate, containing 5% to 50% by weight of at least one itaconic or maleic anhydride, the anhydride added being an amount from 1% to 10% of the weight of the first-mentioned ester monomer used, and copolymerizing the anhydride in the mixture of hydrocarbon, base polymer, and monomer under the influence of an azo or peroxidic polymerization catalyst to form a copolymer dissolved in the hydrocarbon having the anhydride grafted on the base polymer, the average size of alkyl group in the first-mentioned ester being at least eight carbon atoms and being sufficiently large to render the anhydride graft co-polymer soluble in hydrocarbon lubricating oils.

11. A process according to claim 10 in which the anhydride added amounts to 1 to 5% of the first-mentioned ester.

12. A process according to claim 10 in which the anhydride added amounts to 1.3 to 3% of the first-mentioned ester.

13. A process according to claim 10 in which the free radical polymerization initiator comprises a hydroperoxide and a quaternary ammonium salt.

14. A process according to claim 10 wherein a mixture of the ester monomers is polymerized, in which at least one of said ester monomers supplies an oil-solubilizing group, together with a minor proportion of at least one other polymerizable monovinylidene compound until 50% to 90% thereof has formed base polymer.

15. A process according to claim 10 in which said anhydride is itaconic anhydride.

16. The product of claim 10.

17. The product of claim 14.

18. A composition comprising a major portion of a lubricating oil and at least about 0.0125% by weight, based on the weight of the oil, of a copolymer obtained by the process of claim 10 above.

19. A composition according to claim 18 in which the proportion of the copolymer is 0.1 to 15%, based on the weight of the oil.

20. A composition comprising a major proportion of a liquid hydrocarbon fuel and at least about 0.001 to 0.1% by weight, based on the weight of the fuel, of a copolymer obtained by the process of claim 10 above.

21. A composition according to claim 20 in which the proportion of the copolymer is 0.01 to 0.05%, based on the weight of the fuel.

References Cited

UNITED STATES PATENTS

| | | | |
|---|---|---|---|
| 2,892,792 | 6/1959 | Stewart et al. | 252—56 |
| 3,232,903 | 2/1966 | Schmidle et al. | 252—56 X |
| 3,277,157 | 10/1966 | Stewart et al. | 252—56 X |

DANIEL E. WYMAN, Primary Examiner

W. H. CANNON, Assistant Examiner

U.S. Cl. X.R.

260—885; 44—62